United States Patent

Magner, Jr. et al.

[15] 3,644,696

[45] Feb. 22, 1972

[54] MEANS FOR SMOOTHING THE INSIDE SURFACE OF PLASTIC HOSE

[72] Inventors: Philip G. Magner, Jr.; Robert W. Mitten, both of Wabash, Ind.

[73] Assignee: The General Tire & Rubber Company

[22] Filed: Aug. 28, 1970

[21] Appl. No.: 68,060

[52] U.S. Cl. ............................. 219/10.57, 134/1, 219/10.79
[51] Int. Cl. ........................................ H05b 5/00, H05b 9/06
[58] Field of Search ........................ 219/10.57, 10.49, 10.79; 134/1

[56] References Cited

UNITED STATES PATENTS

| | | | |
|---|---|---|---|
| 3,416,982 | 12/1968 | Petzetakis | 156/193 |
| 2,556,243 | 6/1951 | Vaughn | 219/10.57 |
| 2,613,863 | 10/1952 | Loughan et al. | 219/10.57 X |
| 2,759,085 | 8/1956 | Van Iperen | 219/10.49 X |
| 3,092,514 | 6/1953 | Tomberlin | 219/10.55 X |
| 3,492,453 | 1/1970 | Hurst | 219/10.49 |

*Primary Examiner*—J. V. Truhe
*Assistant Examiner*—Hugh D. Jaeger
*Attorney*—Frank C. Rote, Jr. and Harry F. Pepper, Jr.

[57] ABSTRACT

The interior surface of thermoplastic hose may contain small crevices, patterns and undercuts which serve to increase the frictional resistance to flow of material through the hose, and which provide sites for the accumulation of material transported therethrough. This is particularly true of plastic hose that is sized and calibrated on a mandrel covered with thin moving tapes which leave tape impressions and ridges on the inside of the hose. This problem is solved by the present invention which utilizes a radiation body which is supported inside of an axially moving hose and which is heated by electrical induction. The heat radiated from the body softens the inside of the hose and allows the surface tension of the plastic to smooth the interior of the hose. Various means are described for anchoring or supporting the radiation body within the hose.

11 Claims, 5 Drawing Figures

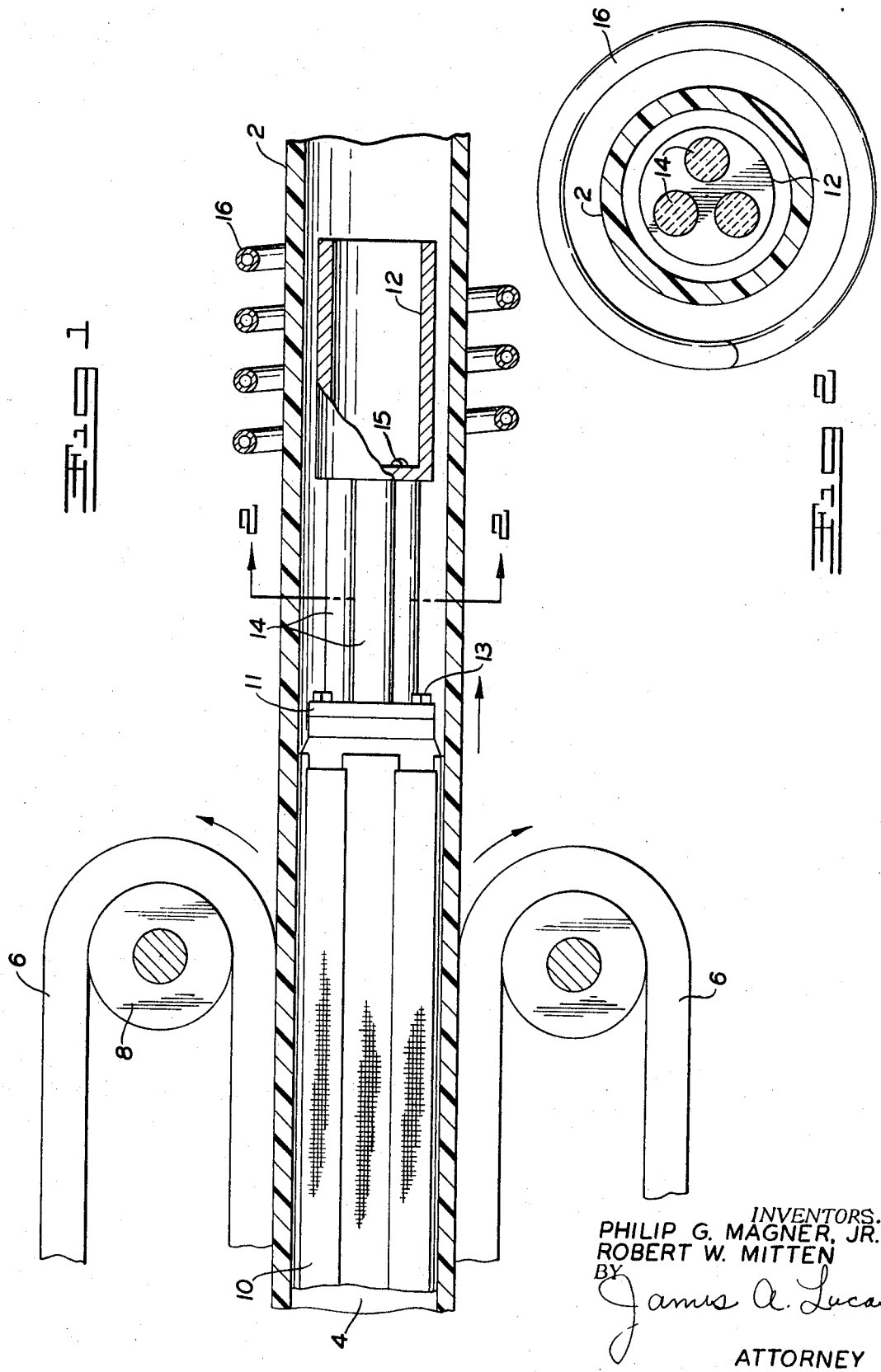

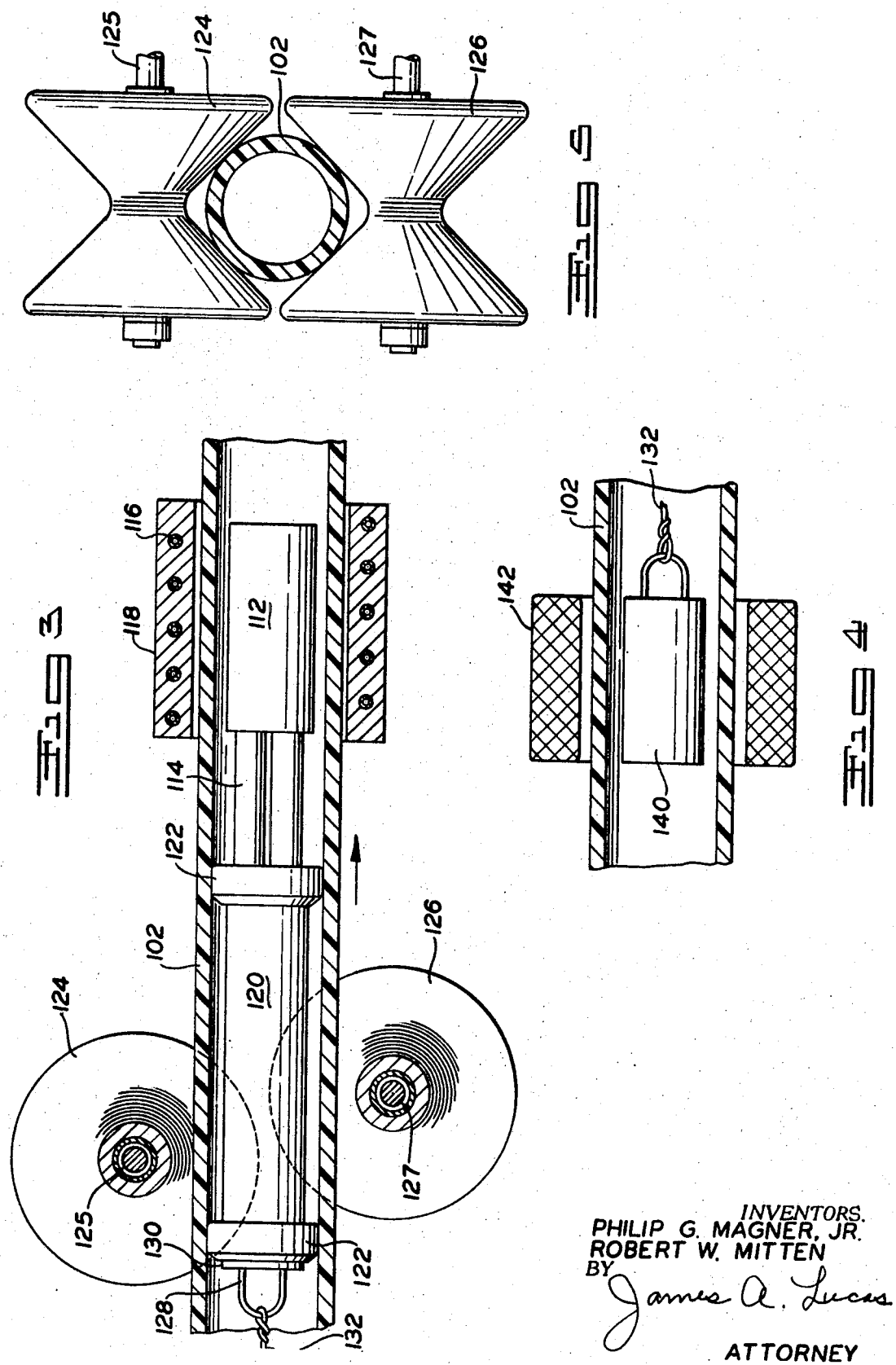

MEANS FOR SMOOTHING THE INSIDE SURFACE OF PLASTIC HOSE

BACKGROUND OF THE INVENTION

In recent years, plastic hose has found widespread use. This hose may assume a variety of shapes and sizes, may be rigid or flexible, and may be produced from thermoplastic or thermosetting polymeric materials. The hose is generally formed by extrusion, although it may also be produced by molding or other suitable means. Hose, as it is hereinafter used throughout the specification and claims, shall refer to pipes, tube or tubing, hose, and conduit, flexible or rigid, large or small made from a suitable thermoplastic material such as polyvinyl chloride. The strength and high temperature properties of hose may be improved by the use of reinforcements such as braids, coverings or spiral reinforcing means embedded within the walls of the hose.

A recent improvement in hose utilizes a high-strength core of rigid thermoplastic material embedded in a softer matrix. U.S. Pat. No. 3,416,982 describes a method and apparatus of manufacturing a strong seamless hose of this type comprising a rigid core of polyvinyl chloride and a flexible matrix of plasticized polyvinyl chloride. The unplasticized core is extruded within a stream of softer material, after which the composite is extruded through the nozzle of a rotating head onto a suitable calibration unit, with adjacent convolutions of the extruded material contacting and fusing to one another immediately upon leaving the nozzle. The extrusion is carried out at a temperature at which the composite is soft and deformable.

As the hose leaves the extruder, its internal diameter is calibrated by passing the hose axially along a rigid hollow mandrel supported in axial alignment with the hose. The details of this calibration mandrel are described in U.S. Pat. No. 3,395,205. The surface of the calibration mandrel is completely covered with longitudinally extending thin flexible continuous tapes. These tapes are moved by the hose as it is expressed from the extruder and becomes solidified. The tapes are typically of fiber glass reinforced Teflon. They overlap one another around the circumference of the cylinder and have a surface pattern which becomes embossed on the inside of the hose during calibration. The juncture between adjacent tapes creates longitudinally extending ridges and undercuts on the inside of the hose. The ridges and the tape patterns coact to produce resistance to fluid flow within the hose. When the hose is used to convey food products, pharmaceuticals, or other sensitive materials, these ridges and patterns sometimes retain some of the material which may then sour, spoil, cultivate mold growth, or otherwise contaminate or adversely affect the quality of the material that subsequently passes through the hose.

BRIEF DESCRIPTION OF THE INVENTION

It is one object of the present invention to overcome these aforedescribed drawbacks.

Another object is to provide a smooth interior for a plastic hose.

These and other objects are achieved in the manner to be hereinafter more fully described, by the use of a method and apparatus for heating the interior of a plastic hose to a temperature sufficiently high to cause the interior surface of the hose to soften and to flow to eliminate tape marks and ridges. This is achieved by axially positioning a cylindrical body, capable of being heated by induction heating, within the hose, concentrically locating an induction coil axially around the hose and the body, and thereafter heating the body by induction heat while axially moving the hose with respect to the body at a sufficient rate, with respect to the rate of heating, to heat the inside of the hose surface to permit the surface tension of the plastic to smooth out the irregularities.

BRIEF DESCRIPTION OF THE DRAWINGS

FIG. 1 is a cross-sectional view of the letoff end of a calibration mandrel and a heating arrangement for use in smoothing the interior of a thermoplastic hose;

FIG. 2 is a full cross-sectional view taken along Lines 2—2 of FIG. 1;

FIG. 3 is a cross-sectional view showing an alternative means for supporting a heating unit within a moving hose;

FIG. 4 is a cross section showing the use of magnetic means to anchor a heating unit within a moving hose; and FIG. 5 is an end view of the rollers shown in FIG. 3.

DETAILED DESCRIPTION OF THE INVENTION

In more detail, the inside surface of a thermoplastic hose is smoothed by heating the surface to a temperature sufficiently high to permit the surface tension of the softened thermoplastic material to smooth out minor irregularities in the surface. The heat source is a heating unit positioned inside of the hose, heated by an induction coil concentric therewith, and positioned around the outside of the hose. The heating unit radiates heat to the interior of the hose.

Referring now to FIG. 1, a continuous length of plastic hose 2 is propelled along a calibration mandrel 4 by two or more soft continuous belts 6 passing around appropriate pulley wheels 8. The calibration mandrel 4 is hollow and is covered with a plurality of continuous thin flexible tapes 10, which are moved by the hose as it is propelled along the surface of the unit. At the end of the calibration mandrel the tapes pass through slots into the interior of the mandrel. The calibration mandrel is typically joined to the head of an extruder (not shown) which forms the hose. The extrusion rate and length of the mandrel are controlled so that the hose is cooled sufficiently to be self-supporting and dimensionally stable by the time it reaches the letoff end 5 of the calibration mandrel.

Downstream from the calibration mandrel 4 and axially aligned therewith and with the hose is a heating unit 12. This unit is preferably made from any metallic or nonmetallic material that can be heated by induction and can radiate heat to the wall of the hose 2. Among the metals that are preferred for this use are iron and its alloys while carbon is a suitable nonmetallic material. The heating unit 12 is in the shape of a cylinder that is closed at one end. The outer cylindrical surface of the unit corresponds in shape to the interior of the hose and is spaced therefrom. If the hose should have a cross section that was not cylindrical, the heating unit should preferably have a similar shape so that the entire inner surface of the hose moving past the heating unit is spaced an equal distance from the surface of the heating unit. A thermal insulator 14 is interposed between the heating unit and the calibration mandrel. This insulator reduces the heat transfer from the heating unit 12 to the calibration mandrel 4, and thereby minimizes the possibility of thermal damage to the tapes or other components of the mandrel, or changes in dimensions of the mandrel, which would adversely affect the calibration of the hose. The insulator is attached to, and extends axially from the calibration mandrel 4. The heating unit 12, in turn, is attached to the insulator. This insulator or heat barrier is shown in FIG. 2 as three ceramic cylinders joined to the mandrel and the heating unit by suitable means. For example, the ends of each cylinder may be tapped and one end joined to a plate 11 which is secured to the mandrel by screws 13. The other end of each cylinder is fastened to the heating unit 12 by screws 15. Instead, of these cylinders, a suitable arrangement of fins or other material or structure can be used to protect the calibration mandrel and other equipment from the heat radiated by the unit 12.

The heating unit 12 is centrally positioned interiorly of the hose 2, while a suitable induction coil 16 surrounds the unit and hose. The coil is typically composed of multiple windings of copper tubing and is connected to a source of alternating current such as a high frequency generator. As current flows through the circular copper coil, a symmetrical electromagnetic field is established. The intensity of the field is determined by the magnitude of the current flowing through the coil and the number of turns in the coil.

An established electromagnetic field will induce circulating currents to flow in any electrically conductive body placed within the field. The resistance offered by the body to the flow of current results in the production of heat within the body. At high frequencies, the induced current is greatest at the surface of the body and decreases inwardly. This is desirable within the context of the present invention since the object is to heat the interior surface of the plastic hose (which is essentially an electrically nonconductive body) by heat radiated from the surface of the heating unit which represents the electrically conductive body. Accordingly, high frequencies, e.g., 450 kH. are desirable. Furthermore, the heating unit should simulate a black body so that the amount of radiated heat is as high as possible.

The heating unit is typically heated to a temperature at which the plastic material at the inner surface of the hose becomes sufficiently soft to allow the surface tension of the plastic to smooth out the surface irregularities. The hose surface should not, however, become so soft or fluid that excessive flow of plastic material occurs. Factors such as the speed of travel of the hose, the nature of the plastic material in the hose, and the size of the hose must all be considered in determining the amount of heat necessary to accomplish the desired results.

FIG. 3 shows another embodiment of the present invention wherein a heating unit 112 is joined to an insulator 114 which in turn is joined to a suitable support 120. The support typically comprises an aluminum cylinder surrounded by a pair of spaced annular, low-friction rings 122 made from a suitable material such as machined TEFLON, silicone rubber or urethane rubber. The outer dimension of these rings when assembled onto the support 120 is slightly smaller than the interior diameter of the hose 102. The hose passes between several pairs of V-shaped rollers each pair comprising an upper roller 124 and a lower roller 126. It then passes through an induction coil 116 shown encased in a suitable potting compound 118 such as epoxy resin. A loop 128 extends from the free end 130 of support 120. One end of a cable 132 is attached to the loop and the other end (not shown) is secured to the end of a calibration mandrel or the like. The frictional drag created by the hose 102 passing over the rings 122 exerts an axial force on the support and serves to maintain tension on the cable 132. The two rings 122 maintain the support 120 and the heating unit 112 centered within the hose. As opposed to the cantilever support for the heating unit as shown in FIG. 3, the unit can be suspended between two supports, each having one or more low friction rings or other means for centering the unit within the hose. This type of unit can be effectively used to post treat the interior surface of a hose that has been previously manufactured and calibrated.

As a further alternative, the heating unit can be mounted on the end of a long rod or support having a length at least equal to the length of the hose to be treated, and can then be moved through the hose. Suitable means are required to move the induction coil along with the heating unit.

FIG. 5 shows some details of rollers 124, 126 of FIG. 3. Each roller is generally V-shaped and forms a trough in cooperation with the other roller through which the hose 102 moves. The rollers are mounted on shafts 125, 127 which are typically held in a suitable support. The rollers are preferably made from a material that will not readily deform the hose yet will provide adequate support for the hose as it moves through the induction coil. A soft material such as foam rubber has been found to be particularly suitable for this purpose. The rollers may be provided with suitable means to change the vertical distance between the upper and lower rollers to accommodate different sizes of hose.

The teachings of the present invention can be practiced at any time after the hose is manufactured. Advantageously, the smoothing of the interior surface occurs immediately after the hose is extruded and is calibrated, before the hose has cooled down to room temperature.

In the manufacture of plastic hose from polyvinyl chloride utilizing the teachings of U.S. Pat. No. 3,416,982 previously referred to, a ¾-inch OD hose is produced at a liner rate of about 150 ft./hr. and leaves the extruder at a temperature of about 350° F. The hose travels along a calibration mandrel and at the letoff of the mandrel has cooled to about 180° F. It passes through a stationary induction coil which is operating at a frequency of 450 kH. and a power output of 2½ kilowatts to induction heat a stationary cylinder within the hose.

The heat radiated from the heating unit continuously raises the interior surface temperature of the moving hose to between 350° F. and 400° F. in order to allow the surface tension of the thermoplastic material at the interior surface of the hose to smooth out the hose.

By reheating the hose extrusion after extrusion and calibration, while the hose is still warm, the amount of radiation energy requirements are kept at a minimum. If the hose has already been cooled to room temperature, the reheating requirements are considerably greater and appropriate adjustments must be made to increase the rate of heat radiation or decrease the relative movement between the hose and the heating unit.

The present invention clearly provides a means for heat polishing the inside of thermoplastic hose without the necessity of modifying the extrusion apparatus. Furthermore, it provides a means for centering a heating unit within the hose without regard to the stiffness or flexibility of the hose. Generally, the heating unit and the hose are cylindrical. However, in the event that the hose has a shape other than circular, e.g., oval, the heating unit should preferably have a similar shape.

Other variations can be made in carrying out the teachings of the invention without departing from the scope thereof. For example, instead of moving the hose past the heating unit, the entire unit and coil can be moved axially along a stationary length of hose.

We claim:

1. An apparatus for smoothing the inner surface of an extruded hollow, substantially tubular thermoplastic product comprising:
   A. a heating device consisting essentially of
      1. a radiant heating unit having an exterior surface
         a. of a shape to conform to the inner surface of said product and
         b. of a size less than the inner surface of said product, and
      2. an induction coil disposed around said heating unit and spaced therefrom a distance greater than the thickness of said product and
   B. means to support said heating unit concentrically within said product, and
   C. means to effect relative movement between said product and said heating unit in a direction parallel to the longitudinal axis of said product.

2. The apparatus of claim 1 wherein the exterior surface of said heating unit is generally cylindrical.

3. The apparatus of claim 1 wherein said heating unit is joined in axial alignment to a support.

4. The apparatus of claim 3 wherein the support is anchored against axial movement with respect to the product.

5. The apparatus of claim 4 wherein said support includes at least two contact rings that are spaced from one another and that are adapted to frictionally contact the inside wall of the hose to maintain the heating unit centered within the product.

6. The apparatus of claim 3 wherein said support comprises a thermal insulator.

7. The apparatus of claim 6 wherein said insulator comprises a plurality of axially aligned, spaced apart, ceramic cylinders.

8. In an apparatus for extruding a hollow thermoplastic substantially tubular product which includes a calibration mandrel having a surface defining the inner contour of the product, said surface composed of a plurality of thin flexible movable tapes and a means for moving the product axially along the mandrel, the improvement comprising:
  A. a radiant heating unit axially aligned with and spaced from said mandrel said unit being smaller in cross section than the cross section of the mandrel and capable of being heated by induction, and
  B. an induction coil concentric with the heating unit having an inner diameter that is larger than the outer diameter of the product.

9. The apparatus of claim 8 wherein the mandrel is separated from the heating unit by a thermal insulator.

10. The apparatus of claim 9 wherein the thermal insulator comprises a plurality of spaced ceramic cylinders axially aligned with the heating mandrel and the unit.

11. The apparatus of claim 8 wherein the heating unit is joined to a cylindrical support, which is tethered to the letoff end of the calibration mandrel by a cable, said support including at least two spaced contact rings adapted to frictionally contact the interior wall of the product to maintain the heating unit centered therein.

* * * * *